United States Patent [19]

Lemstra et al.

[11] 4,362,844

[45] Dec. 7, 1982

[54] BIAXIALLY STRETCHED POLYPROPYLENE-BASED PLASTIC PRODUCTS, AND PROCESS FOR MAKING SUCH PRODUCTS

[75] Inventors: Pieter J. Lemstra, Brunssum; Marcellus J. P. Houben, Geleen, both of Netherlands

[73] Assignee: Stamicarbon, B.V., Geleen, Netherlands

[21] Appl. No.: 267,422

[22] Filed: May 26, 1981

[30] Foreign Application Priority Data

May 31, 1980 [NL] Netherlands .......................... 8003192

[51] Int. Cl.$^3$ ....................... C08L 23/10; C08L 23/26
[52] U.S. Cl. ....................................................... 525/57
[58] Field of Search .................................. 525/57, 227

[56] References Cited

U.S. PATENT DOCUMENTS 3,975,463  8/1976  Hirata et al. ........................... 525/57

*Primary Examiner*—Carman J. Seccuro

[57] ABSTRACT

The invention relates to polypropylene-based plastic products, biaxially stretched below the melting point, wherein the plastic consists substantially of a mixture of 60–95 % by weight of a substantially crystalline propylene polymer and 5–40 % by weight of an ethylene-vinylalcohol copolymer, and to a process for making such products.

According to the invention an ethylene-vinylalcohol copolymer is used having a melting point which is at most equal to that of the propylene polymer, preferably 0–20 K below the melting point of the propylene polymer.

The invention provides biaxially stretched polypropylene products having an outstandingly good gas impermeability while retaining their good properties in respect of optical clarity, mechanical properties and simplicity of production.

9 Claims, No Drawings

BIAXIALLY STRETCHED POLYPROPYLENE-BASED PLASTIC PRODUCTS, AND PROCESS FOR MAKING SUCH PRODUCTS

The invention relates to biaxially stretched polypropylene-based plastic products, and to a process for making polypropylene-based plastic products, wherein the plastic substantially consists of a mixture of polypropylene and an ethylene-vinylalcohol copolymer, in which the plastic is biaxially stretched below the melting point of the polypropylene. Such a process is known from the U.S. Pat. No. 3,975,463. It can be applied, for instance, for making transparant film or packaging containers. Stretching below the melting point offers considerable advantages on the points of the optical and mechanical properties of the resultant products.

A disadvantage attaching to polypropylene-based plastic products is the considerable gas permeability of such products, which makes them less suitable for packing goods under gas pressure, e.g. carbonated drinks or aerosols, and goods liable to degradation under the influence of the ambient air or through loss of water vapour. The addition of an ethylene-vinylalcohol copolymer to the polypropylene according to the teaching of the said U.S. Pat. No. 3,975,463 offers only a very imperfect solution for this problem. It is true that the gas permeability of the known products is lower than that of products from just polypropylene, but still far too high for many practical uses.

According to another proposal (U.S. Pat. No. 3,847,728) plastic products of low gas permeability are made from mixtures of a polyolefin, in particular low-density polyethylene, and an ethylene-vinylalcohol copolymer by melt extrusion followed by a forming operation carried out above the melting points of both polymer components. This means that the advantages of biaxial stretching below the melting point of the plastic are sacrificed. The optical as well as the mechanical properties of the products leave much to be desired. Neither is there good adhesion between the particles of the two polymer components in the plastic product.

The invention fills the need for biaxially stretched polypropylene-based plastic products which have improved gas impermeability and retain good properties as regards optical clarity, mechanical properties and simplicity of production.

According to the invention a biaxially stretched polypropylene-based plastic product, wherein the plastic consists substantially of a mixture of 60–95% by weight of a substantially crystalline propylene polymer and 5–40% by weight of an ethylene-vinylalcohol copolymer, is characterized in that the ethylene-vinylalcohol copolymer has a melting point which is at most equal to that of the propylene polymer. The invention further includes the manufacture of polypropylene-based plastic products in which process the plastic used is a mixture substantially consisting of 60–95% by weight of a substantially crystalline propylene polymer and 5–40% by weight of an ethylene-vinylalcohol copolymer, and in which process the plastic is biaxially stretched below the melting point of the propylene polymer, characterized in that an ethylene-vinylalcohol copolymer is used having a melting point at a most equal to that of the propylene polymer.

The term 'crystalline propylene polymer' here denotes a substantially crystalline polymer consisting predominantly of propylene units. It may contain minor quantities, e.g. at most 30% by weight, of other monomer units, in particular ethylene and/or one or more alkenes-1 with 4–6 carbon atoms in the molecule, for instance butene-1, 4-methylpentene-1, or hexene-1. In particular, the propylene polymer may be homopolypropylene, or a block copolymer of propylene with 1–30, more in particular 1–15% by weight of ethylene, or a random copolymer of propylene and ethylene having an ethylene content of, by preference, 0.1–5% by weight.

The ethylene-vinylalcohol copolymer consists substantially of ethylene and vinylalcohol units and may further contain minor amounts of other monomer units, in particular vinylester units. Copolymers of this type cen be prepared by complete or partial saponification of ethylene-vinylester copolymers. More in particular, the vinylester is a vinylester of a carboxylic acid with 1–6 atoms in the molecule; by preference it is vinylacetate. The degree of saponification is by preference at least 90%, in particular 95–99%. The melting point of the ethylene-vinylalcohol copolymer is not higher than that of the propylene polymer used. By preference the melting point is not more than 30 K, in particular not more than 20 K, lower than the melting point of the propylene polymer. The melting point of the ethylene-vinylalcohol copolymer depends on the degree of saponification, and, in particular, on the ethylene content. The melting point of the ethylene-vinylalcohol copolymer can be simply adapted to that of the propylene polymer used by adapting the ethylene content of the copolymer. The relation between ethylene content and melting point of the ethylene-vinylalcohol copolymer is well-known to persons skilled in the art. The ethylene content preferably amounts to 30–55 mol %, in particular 35–50 mol %.

It is pointed out that the insight that, in order to reach an extremely low gas permeability, an ethylene-vinylalcohol copolymer should be used having a melting point at most equal to that of the propylene polymer can definitely not be derived from the said U.S. Pat. No. 3,975,463. There an ethylene-vinylalcohol copolymer is used having, for instance, an ethylene content of 25.4 mol % and a degree of saponification of, for instance, 99.2%. The melting point of such a copolymer is above that of the polypropylene. The gas-impermeability characteristics of the products obtained are inferior.

By preference the plastics mixture to be used according to the invention contains 10–30% by weight ethylene-vinylalcohol copolymer, more specifically 20–30% by weight.

The plastics mixture may additionally contain minor quantities, e.g. up to 10% by weight, of other components, such as stabilizers, lubricants, antistatic agents, other polymer components, etc., and in particular one or more coupling agents to improve the compatibility of the propylene polymer and the ethylene-vinylalcohol copolymer. Examples of suitable coupling agents are polypropylene modified with acid groups, e.g. polypropylene modified by graft polymerization with maleic anhydride, acrylic acid or another monomer releasing acid groups, copolymers of an alkylene monomer and an unsaturated acid e.g. ethylene-acrylic acid copolymer, or ionomers. Such a coupling agent accounts for, e.g. 1–5% by weight of the plastics mixture.

Preferably, the ethylene-vinylalcohol copolymer used has a melt index higher than that of the propylene polymer, as this results in a plastics mixture of better formability. The melt index of the ethylene-vinylalcohol polymer amounts, for instance, to 1 to 20 (463 K; 2.16 kg), that of the propylene polymer amounts, for instance, to 0.5 to 10 (503 K; 2.16 kg) dg/min, measured according to ASTM-D 1238.

In the process of manufacturing products according to the invention the propylene polymer and the ethylene-vinylalcohol copolymer are mixed in a known way, e.g. in the form of powders or a granulate, followed by mixing in the melt, or by mixing the melts of these polymers. Use is made to this end of mixing rollers, a Banbury mixer or a mixing extruder. Thereafter the plastics mixture is extruded in a known way to, e.g., film or sheeting, or a parison. After that the extrudate is biaxially stretched below the melting point of the propylene polymer. This is done in a manner known per se, e.g. by means of a stretching frame or by lengthwise stretching, e.g. by means of rollers, simultaneous with or followed by crosswise stretching by means of, e.g., clamps—for making so-called BOPP film-, by deep drawing—for making packaging containers, e.g. margarine tubs-, or by blowing bottles from parisons. For briefness, reference is made for these well-known techniques to the books 'Extrudierte Reinfolien und Verbundfolien' (1976), 'Spritzblasen' (1976), 'Technologien des Blasformens' (1977) and 'Folien, Gewebe, Vliesstoffe aus Polypropylen' (1979), issued by the Verein Deutscher Ingenieure (VDI-Verlag GmbH, Düsseldorf) in the series 'Ingenieurswissen'. The stretching ratio is, for instance, 2–10 in both directions. The extrusion temperature may be equal to the extrusion temperatures normally used with polypropylene, and be, for instance, 450 to 550 K. The stretching temperature is at most equal to the melting temperature of the propylene polymer. 'Melting temperature' here refers to the temperature at which the propylene polymer melts, as measured by means of the Differential Scanning Calorimetry method, using a heating rate equal to that applied in the stretching procedure. The use of a stretching temperature below room temperature is not recommended. Preferably the stretching temperature is at a level between the melting temperature of the propylene polymer and a temperature of 35 K lower than that, in particular between 400 and 435 K. The film or wall thickness of the product is, for instance, 10–5000 μm.

The products according to the invention have a particularly low permeability to gases like oxygen, water vapour and carbon dioxide. They possess good mechanical properties, in particular high rigidity and impact strength, and have good see-through.

The invention will be further elucidated in the following non-restrictive examples and comparative experiments.

EXAMPLES I-III and Comparative Experiment A

On a mixing roller 30 parts by weight of powdery ethylene-vinylalcohol copolymer having a melt index of 5 dg/min (ASTM-D 1238, 463 K, 2.16 kg) and an ethylene content of 40 mol % is mixed with 5 parts by weight of the coupling agent Admer QF-500 of Mitsui Petrochemical Industries Ltd. Next, 65 parts by weight of powdery polypropylene (homopolymer) having a melt index of 1.3 dg/min (ASTM-D 1238, 503 K, 2.16 kg) is admixed on the roller. The rough sheet from the roller is next compressed at a temperature of 573 K to form a flat sheet having a thickness of 1 mm. This sheet is opaque.

The melting point of the ethylene-vinylalcohol copolymer used, measured by Differential Scanning Calorimetry (DSC) using a heating rate of 10 K/min, is equal to that of the polypropylene applied, viz. about 439 K. The degree of saponification is approx. 98%.

The resulting sheet is biaxially stretched on a Brückner stretching frame at the stretching temperatures mentioned in the accompanying table, with the use of the stretching ratios indicated. In all cases the stretching ratios in lengthwise and crosswise directions were equal.

For the resulting biaxially stretched films the table mentions the gas permeability values $P(CO_2)$ in respect of carbon dioxide at 296 K, in terms of $cm^3$ of permeated gas at 1 cm of film-thickness and per $cm^2$ of film area in 24 hours, per bar of gas pressure difference. Gloss was measured according to ASTM-D 2457 (45°), opacity according to ASTM-D 1003, the resistance to rupture as rupture energy per unit film thickness measured on the basis of test method ASTM-D 1709-67 A with a faling dart of 2.0 kg by weight. In the DSC measurement the unstretched as well as the stretched sheet/film show only one melting endotherm, which is in agreement with the equality of the melting points of the ethylene-vinylalcohol copolymer and the polypropylene.

The gas permeability of the biaxially stretched product is lower by a factor of 100 than that of similar polypropylene products and is in the same range as that of the particularly good, but costly, barrier plastics based on acrylonitrile. The products according to the invention are particularly clear and also show good properties in other respects.

Comparative Experiment B

A mixture of 30 parts by weight of ethylene-vinylalcohol copolymer having a melt index of 5 dg/min (463 K) and an ethylene content of 40 mol %, 5 parts by weight of Admer QF-500, and 65 parts by weight of polypropylene having a melt index of 1.3 dg/min (503 K) is extruded to blown film. The extrusion temperature is 503 K. The blowing ratio and the take-off rate are so adjusted to each other that the cylinder leaving the extrusion head is symmetrically biaxially stretched above its melting point. The resulting film is cooled in air.

The properties of the blow film are stated in the table. The gas permeability is higher than that of films biaxially stretched below the melting point, and the optical and mechanical properties are on an unacceptably low level.

Comparative Experiment C

The process is carried out as in Examples I-III, but the ethylene-vinylalcohol copolymer now used has a melting point of 458 K, which is above that of the polypropylene. The ethylene content of the copolymer is 30 mol %, the degree of saponification 98%.

The result repesented in the table show the gas permeability of the biaxially stretched film to be of the same order as that of the film consisting of polypropylene only. The film clearly shows unmelted copolymer particles dispersed in the polypropylene matrix. Attempts to raise the stretching temperature to above about 445 K result in tearing of the film.

EXAMPLES IV AND V

The process is carried out as in Examples I-III, but the propylene polymer used now is polypropylene homopolymer having a melt index of 6 dg/min (503 K).

The results are shown in the table. The gas permeability of the film obtained is within the same range as that of barrier plastics based on polyvinylchloride.

EXAMPLE VI

The process is carried out as in Examples I-III, but with a weight ratio of ethylene-vinylalcohol copolymer: polypropylene of 15:85. The results are mentioned in the table.

TABLE

| Ex./Comp. Expt. | Stretching temp. K | Stretching ratios ⊥ and // | $P(CO_2) \times 10^4$ | Thickness, μm | Gloss, o/oo | Opacity, % | Resist. to rupt., kJ/m |
| --- | --- | --- | --- | --- | --- | --- | --- |
| I | 438 | 4:1 | 0.24 | 28 | 76 | 3 | 130 |
| II | 433 | 4:1 | 0.17 | 30 | 74 | 5 | 190 |
| III | 423 | 4:1 | 0.14 | 30 | 69 | 10 | 150 |
| A | — | 0 | 8.3 | ca. 1000 | — | — | — |
| B |  | 4:1 | 0.45 | 50 | 15 | 45 | <1 |
| C | 438 | 4:1 | 9 | 30 | 4 | 92 | 110 |
| IV | 438 | 4:1 | 2 | 30 | 50 | 10 | 40 |
| V | 433 | 4:1 | 1.5 | 27 | 48 | 16 | 35 |
| VI | 438 | 2:1 | 1.5 | 50 | 70 | 4 | 140 |

We claim:

1. Plastic product based on polypropylene, biaxially stretched below the melting point, wherein the plastic consists substantially of a mixture of 60-95% by weight of a substantially crystalline propylene polymer and 5-40% by weight of an ethylene-vinylalcohol copolymer, characterized in that the ethylene-vinylalcohol copolymer has a melting point which is at most equal to that of the propylene polymer.

2. Product according to claim 1, characterized in that the ethylene-vinylalcohol copolymer has a melting point that is not more than 20 K lower than the melting point of the propylene polymer.

3. Product according to claim 1 or 2, characterized in that the ethylene content of the ethylene-vinylalcohol copolymer is 30-55 mol %.

4. Product according to claim 3, characterized in that the ethylene content of the ethylene-vinylalcohol copolymer is 35-50 mol %.

5. Product according to any one of the claims 1-4, characterized in that the ethylene-vinylalcohol copolymer has a degree of saponification of at least 95%.

6. Product according to any one of the claims 1-5, characterized in that the plastics mixture contains 10-30% by weight of ethylene-vinylalcohol copolymer.

7. Product according to any one of the claims 1-6, characterized in that the plastics mixture contains 1-5% by weight of a coupling agent.

8. Product according to any one of the claims 1-7, characterized in that the melt index of the ethylene-vinylalcohol copolymer is higher than that of the propylene polymer.

9. Process of making plastic products based on polypropylene, wherein the plastic used is a mixture substantially consisting of 60-95% by weight of a substantially crystalline propylene polymer and 5-40% by weight of an ethylene-vinylalcohol copolymer, and in which process the plastic is biaxially stretched below the melting point of the propylene polymer, characterized in that an ethylene-vinylalcohol copolymer is used having a melting point at most equal to that of the propylene polymer.

* * * * *